United States Patent
Trahan et al.

(10) Patent No.: US 11,985,984 B2
(45) Date of Patent: May 21, 2024

(54) METHOD AND APPARATUS TO EXTRACT CRAWFISH TAIL MEAT

(71) Applicants: David O. Trahan, Lafayette, LA (US); Richard E. Trahan, Lafayette, LA (US)

(72) Inventors: David O. Trahan, Lafayette, LA (US); Richard E. Trahan, Lafayette, LA (US)

(*) Notice: Subject to any disclaimer, the term of this patent is extended or adjusted under 35 U.S.C. 154(b) by 146 days.

(21) Appl. No.: 17/849,208

(22) Filed: Jun. 24, 2022

(65) Prior Publication Data
US 2022/0408743 A1   Dec. 29, 2022

Related U.S. Application Data (60) Provisional application No. 63/214,644, filed on Jun. 24, 2021.

(51) Int. Cl.
*A22C 29/00*   (2006.01)
*A22C 29/02*   (2006.01)

(52) U.S. Cl.
CPC .......... *A22C 29/025* (2013.01); *A22C 29/023* (2013.01)

(58) Field of Classification Search
CPC ............................. A22C 29/023; A22C 29/025
USPC .......................................................... 452/8
See application file for complete search history.

(56) References Cited

U.S. PATENT DOCUMENTS

| | | | |
|---|---|---|---|
| 2,660,754 A | 12/1953 | Roshko | |
| 2,987,759 A | 6/1961 | Lapeyre et al. | |
| 3,110,926 A | 11/1963 | Martin | |
| 3,758,921 A | 9/1973 | Ingalls | |
| 3,789,460 A | 2/1974 | Ingalls | |
| 3,871,086 A | 3/1975 | Rutledge | |
| 4,121,322 A | 10/1978 | Rutledge | |
| 4,196,495 A | 4/1980 | Mestayer et al. | |
| 4,385,422 A | 5/1983 | Ingalls et al. | |
| 4,535,507 A * | 8/1985 | Reinke | A22C 29/025 452/1 |
| 4,715,093 A * | 12/1987 | Lapeyre | A22C 29/025 452/10 |
| 4,928,352 A | 5/1990 | Thibodeaux | |
| 6,042,465 A | 3/2000 | Larson et al. | |

* cited by examiner

Primary Examiner — Richard T Price, Jr.
(74) Attorney, Agent, or Firm — McCutcheon Joseph, PLLC (57) ABSTRACT

A novel method for automated extraction of crawfish tail meat comprises placing cooked crawfish on a tray having a bottom slot, applying a downward pressure to the cooked crawfish, extending a rotating brush through the bottom slot to urge the cooked crawfish into a horizontally exposed position, extending a rotating blade through the bottom slot to an incision, then applying a vacuum force to the bottom slot simultaneous to an increase in the downward pressure, causing the cooked crawfish to bulge and the tail meat to be extracted through the slot, after which the carcass is ejected. A plurality of trays can either be rotated in a circular path or conveyed along a linear path above the various tools as cooked crawfish are loaded and carcasses are ejected.

14 Claims, 12 Drawing Sheets

METHOD AND APPARATUS TO EXTRACT CRAWFISH TAIL MEAT

REFERENCE TO RELATED APPLICATIONS

This is a utility patent application claiming priority to U.S. Provisional Application No. 63/214,644, filed 24 Jun. 2022 and having the same title and inventors. The full contents of the above-referenced provisional are incorporated by reference.

FIELD

The present invention relates, generally, to an improved process method and apparatus for extracting tail meat and other edible portions from crawfish (also known as crayfish). The present invention improves the process by utilizing a novel method for cutting or slicing an incision into the underside exoskeleton of the crawfish body followed by applying a downward pressure from above and a vacuum force from below to extract tail meat and other edible portions through the incision. More particularly, the present invention discloses a unique apparatus and method for arranging the crawfish body and tail in a manner to improve the efficiency for slicing open of crawfish exoskeleton body and tail allowing for the vacuum or suction force to extract tail meat and other edible portions.

BACKGROUND

The farming of freshwater crawfish (or crayfish) is mainly carried out in the southern states of the U.S., and in Australia and in some European countries. Crawfish farming is usually a part of farming rice in flat shallow water-holding ponds. In the U.S., crawfish farming is a major aquaculture industry with over 400,000 acres of land reportedly used to grow crawfish.

The crawfish is known as a decapod crustacean. As with other decapod crustaceans a major part of the edible meat is derived from the abdominal muscle, or known as the "tail meat", located in the tail of the crawfish. Most crawfish are boiled followed by hand-peeling to extract the tail meat and other edible portions in processing centers using human workers. The tail meat yield varies according to the species and may range from 30 to 40% of the crawfish's total weight. The harvesting season in the southern U.S. runs from about January to about July each year, coinciding with the use of the fields for rice cultivation. Generally, crawfish mating usually occurs in the late summer or autumn following the harvesting of rice crop, when fields are flooded to improve the crawfish habitat. In the late summer or fall the fertilized female crawfish with attached eggs remain in subterranean burrows over the winter. In the early spring the eggs hatch into juveniles which remain attached to the mother for a period. After one moult they become active and leave the mother after a few days once their appendages are partially developed. Growth rates are temperature and species dependent. The predominant species in the U.S. the *Procambarus clarkii* and *Cherax quadricarinatus*, and each species can reach market size in less than 12 months. The amount of production varies from year-to-year, mainly in relation to the land area of ponds flooded and amount of warm climate during the prime harvest period. Crawfish are good aquaculture organisms as they reproduce readily in culture and do not have larvae. They are polytrophic and will feed on inexpensive feeds.

Crawfish are popular human food due to their attractive flavor. One limitation on increased availability during a season is the absence of a suitable mechanized process method or apparatus to efficiently extract the tail meat and other edible portions using a non-complicated mechanical process.

There is a need for an efficient crawfish processing apparatus to mechanically extract crawfish tail meat. Manual peeling of crawfish is time consuming and frequently cuts the hands of human peelers. In recent years, foreign processors have sold product at much lower prices due to lower labor costs. An efficient crawfish tail meat extraction apparatus would provide crawfish processing plants with a lower cost per unit of tail meat due to a lesser need for human involvement in the peeling and tail meat extraction process.

Historically, the challenge of mechanizing the process of removing the crawfish tail meat from boiled crawfish has been undertaken with little success. Some have attempted to adapt shrimp peeling machines, but the crawfish has an exceptionally hard shell, unlike the soft and pliable shell of a shrimp. Thus, subjecting the crawfish to a rolling or squeezing action or air pressure to eject the meat from the tail section damages the texture of the meat and renders it unpalatable. Additionally, due to the seasonality of the crawfish harvest season and smaller volume in comparison to shrimp volumes, less emphasis has been placed on mechanized crawfish peeling.

Previous attempts to mechanize crawfish tail meat extraction utilized one of three principles to process the crawfish: 1) rollers acting to squeeze from the tail end to force the tail meat out, 2) cutting blades incising the top of the exoskeleton to ease mechanical removal of tail meat, or 3) a fluid (air or water) is injected into the base tip of the tail to fluid force the tail meat out. While each of these methods have some merit, the designs proved commercially to be deficient for industrial application. Previous machines required virtually the same amount of labor as currently employed to achieve similar processing rates. Therefore today few, if any, processing plants in the southern U.S. utilize process machinery (aside from size grading equipment) to facilitate the tail meat extraction process.

There are many patents which are directed to the processing of crawfish and crustaceans. Apparatus and methods have been used in the past to remove tail meat from crawfish by mechanical means. Non-limiting examples include the following patents:

U.S. Pat. No. 2,660,754 to Roshko disclosed a machine for separating the meat from the exoskeleton and includes a frame having an upper and lower mounted roller members, and the rollers being disposed one substantially vertical above the other with an adjustment tensioning means between the mounted members urging the members together. A water jet spray in front of the apparatus is provided. Rollers continuously rotate during operation. The crawfish are fed into the device, tail first one at a time, the heat portion of the crawfish having been first removed by hand. As the crawfish enters the device, the exoskeleton is cracked and opened with a motion that loosens the meat and the spray from a water jet is directed so that it washes the meat, out of the hull, assisting the squeezing action of the rollers.

U.S. Pat. No. 2,987,759 to Lapeyre disclosed a method for peeling crustaceans such as crawfish, shrimp, lobsters and the like in which the shell is pinched or unraveled from the meat by a unit with at least two peeling members to form a peeling nip.

U.S. Pat. No. 3,110,926 to Martin disclosed a method for the treatment of crustacea such as crayfish, prawns and the like where the tail portions of the crustacea are severed from the non-edible head and body portions.

U.S. Pat. No. 3,758,921 to Ingalls disclosed a machine to automatically peel crawfish or other crustaceans by gripping the head and tail respectively between grippers on separate conveyers which diverge during movement separating the head from the tail section. Then a cutter positioned laterally to sever the rear extremity of the tail section front the remainder leaving a rearward opening for directing a high velocity jet of fluid into the tail to eject the tail meat.

U.S. Pat. No. 3,789,460 to Ingalls disclosed a crawfish peeler comprising a pair of rotors adjacent to each other rotating in opposite directions. One rotor with a pair of grippers to engage with a crawfish placed between the rotors to remove the head from the crawfish. A sharp pin enters the rear of the tail section to inject a fluid through the nozzle to eject the tail meat.

U.S. Pat. No. 3,871,086 to Rutledge disclosed a crawfish tail without head section attached passed through parallel cutting blade assemblies composed of concentric blades that may be of equal or unequal height. The apparatus operates by shattering the dorsal shell of the crawfish to remove the meat product.

U.S. Pat. No. 4,121,322 to Rutledge disclosed an apparatus for extracting crawfish tail meat which comprises two rollers positioned adjacent to each other with a nip to receive the whole crawfish. One of the rollers provides grooves sufficient in size to hold the crustacean meat as it is squeezed out of the crustacean shell by the rotating action of the rollers.

U.S. Pat. No. 4,196,495 to Mestayer, et al disclosed an apparatus for separating edible tail meat portions of crawfish and similar crustaceans from their exoskeleton by using two rollers. The first roller having a concave lateral peripheral edge surface which is opposed at a constant spacing by a convex lateral peripheral edge surface of a second roller. The rollers rotating in opposite direction. The rear margins of the tail flapper of the crawfish are grasped between the counter rotating rollers, exoskeleton portions covering the tail being pulled between the rollers to peel the exoskeleton off revealing the edible portion.

U.S. Pat. No. 4,385,422 to Ingalls, et al disclosed an apparatus for de-heading and peeling crawfish comprising pairs of gripper assemblies for operative engagement with the head and tail sections of a crawfish, respectively, supported for movement in synchronized relation through separate but tangentially related orbits wherein the pairs of grippers simultaneously move in a common direction through or past the point of tangency of their respective orbits wherein the tail holding gripper assemblies each comprise a lower crawfish pan constructed from flexible rubber or plastic member having an arcuate cross section greater than 180° and a top arm member pivotally mounted above the lower pan to hold the crawfish in the pan during the de-heading cycle, the pivoting of top arm member being actuated by a simplified cam assembly.

U.S. Pat. No. 4,928,352 to Thibodeaux disclosed a crawfish peeling apparatus for separating the crawfish upper and lower tail exoskeleton portions from the soft inner meat product. The crawfish travels a path that traverses a cutter. The cutter includes a pair of spaced apart rotary blades, each pair overlapping in a scissoring fashion so the longitudinal edge cuts can be made along the tell and right sides of the crawfish tail and extending substantially the lull length of the crawfish tail.

U.S. Pat. No. 6,042,465 to Larson, et al disclosed a method and apparatus for peeling crawfish by applying a pair of rollers mounted on a frame in a position to receive crawfish one at a time from a conveyor. The conveyor transports the crawfish to be peeled, the conveyor includes multiple conveyor belts with at least two positioned one above the other sandwiching the crawfish between them. The conveyor in combination with an alignment member straightens the tail portion of the crawfish and delivers the crawfish to the peeling mechanism. The alignment member can include an inclined plate or ramp that gradually extends the tail of the crawfish as the conveyor transports the crawfish toward the peeling mechanism. The head and tail are separated, and an air nozzle is inserted into the rear of the tail section as two rollers squeeze the tail to extract the tail meat.

Thus, none of the conventional methods described above, alone or in combination, provided a method or apparatus capable of commercially extracting crawfish tail meat and failed to overcome the limitations of the prior art.

SUMMARY OF INVENTION

A primary objective of the invention is to provide an improved method and apparatus for processing crawfish to extract the tail meat and other edible portions of the crawfish. The present invention improves previous attempts to mechanize crawfish tail meat extraction without the need for separating the head and tail portions of the crawfish exoskeleton and without the need for crushing rollers, or air/fluid pressure to extract tail meat. This invention discloses an improved process and method for cutting or slicing the underside exoskeleton of the crawfish body followed by applying a downward pressure on the tail exoskeleton to open the cut or slice region of the tail followed by applying a vacuum force or suction force to the tail section efficiently extracting tail meat and other edible portions.

Another object of the invention is to provide a tray or trough to securely contain the whole cooked crawfish in an upright "tail first" position during the tail meat extraction process which enhances the cutting action of the underside of the crawfish exoskeleton when pressure from above the crawfish tail is applied causing tail exoskeleton to spread open along the cut line in a manner improving the efficiency of extracting tail meat when applying a vacuum or suction force from below to extract tail meat and other edible portions of crawfish.

Still another object of the invention is to provide a flat round rotating table on which whole cooked crawfish are placed in trays or troughs affixed to the top surface of the rotating table surface in an upright and tail first orientation. When placed into this tray or trough, a machine vision camera connected to an onboard computer controller and positioned at a point above the tray views and evaluates the crawfish's position for correct placement and orientation. If the crawfish is in an incorrect position, the operator is notified by a visual message or visible light to alert the operator to adjust and reposition the crawfish body in the tray before proceeding with the process. When the crawfish body is properly positioned in the tray, a mechanical rigid flap or bar lowers down from above the crawfish body to hold the crawfish in place in the correct orientation. An elastomeric air pressurized bag is affixed to the underside of this flap, pressurized by an external pressurized air source.

A signal from the onboard computer controller directs an inline control valve in an air conduit leading to the airbag to open allowing pressurized air to enter the airbag, enlarging the airbag, and applying downward pressure to the crawfish body. Below the tray holding the crawfish is mounted a mechanized rotating device, such as a bristle brush. The rotating brush device is able to move upward through an opening in the base of the rotating table and tray in a manner to engage the tail section of the crawfish causing the tail to uncurl into a straight flat position. The brush rotates at a speed and a direction to cause the curled crawfish tail to uncurl and open into a straight flat position over the opening or bottom slot. The pressure applied by the flap and air pressured bag located above the crawfish forces the crawfish tail to remain in the flattened position as it moves forward in the process. Once the tail uncurling action step is complete the brush, or other rotating means of opening the tail, lowers down and out of the bottom slot or opening allowing the table the freedom to rotate. The table rotates in a direction to position the tray containing a single crawfish in a second process position where a mechanized rotating saw blade, or shell cutting device, is mounted below the rotating tray. When directed by the onboard computer controller the rotating saw blade device travels up through the opening or bottom slot in the base of the tray engaging with the underneath area of the crawfish exoskeleton to slice it in a linear manner from head to tip of the tail section. Once the bottom of the crawfish exoskeleton is sliced the mechanized rotating saw device disengages with the crawfish exoskeleton lowering itself out of the bottom opening or slot allowing the rotating table the freedom to rotate to the next process position.

Once the rotating table is moved to the third process position the mechanical flap above the crawfish body is directed by the onboard computer controller to increase the air pressure within the airbag positioned above the crawfish tail section applying greater downward pressure to press the crawfish tail section down in the direction of the opening or bottom slot within the tray. To improve the extraction process the internal area of the bottom of the tray is configured with linear projections like projecting ridges that travel along either side of the linear opening or bottom slot in such a manner to improve the opening of the tail exoskeleton exposing the crawfish tail to the open bottom slot below. At or about the same time a vacuum nozzle of sufficient size and formed in a shape similar to the opening or slot in the bottom of the tray is mounted below the opening. When directed by the onboard computer controller the vacuum device moves up and engages with the bottom of the rotating table using a flexible seal. When the seal is made between the bottom of the rotating table and the vacuum device a vacuum or suction is applied to the opening by an external vacuum source. The vacuum and suction pressure is of sufficient force to extract the exposed tail meat and other edible portions down and into the vacuum conduit. The vacuum period occurs in a matter of a few seconds. Once the tail meat is extracted the vacuum device disengages with the bottom side of the rotating table allowing it to freely rotate to the next process position. The onboard computer controller directs the table to rotate to the next process position.

When the rotating table is in position at the fourth process position the pressure flap above the crawfish body and the pressure air bag fully disengage with the crawfish carcass by moving up and away. When the crawfish carcass is released from above a pressure a fluid nozzle located in the base of the tray exerts air pressure of sufficient force and duration to dislodge and eject the crawfish carcass upward and out of the fray into a vacuum conduit to convey crawfish carcass now without tail meat into a holding receptacle. Following carcass ejection, as directed by the onboard computer controller the table rotates to the starting position to recommence the tail meat extraction process by accepting another cooked crawfish.

In an embodiment of the invention, the circular motion of the rotating table is powered by any suitable power source, including manual human action, fluid hydraulic, air pneumatic, or electric motor and with their actions directed or controlled by an onboard computer controller.

In an embodiment of the invention, each crawfish holding slot is monitored with an electronic device to communicate via an electric wire or wirelessly with the rotating motor to rotate to the next process position of the various tail meat extraction process stages.

In one embodiment of the invention, the trays on the rotating table are manually loaded by a human worker placing the crawfish in an upright tail-forward head-following orientation.

In another embodiment of the invention, a rotating conveyor moves the crawfish in the proper upright, tail first orientation to the opening of the crawfish tray where it is pushed into the tray by a loading piston. Once the crawfish enters the tray the empty conveyor returns to the starting position to receive additional crawfish.

In a preferred embodiment, the conveyor includes a plurality of slots or trays attached to or integrated into the construction of the conveyor system and positioned in a manner to properly align the crawfish to the opening of the tail meet extraction tray on the rotating table.

In a preferred embodiment, the individual trays of the conveyor system are appropriately sized to receive crawfish in an upright tail first, head-following orientation. The tray may be tatted with and use a top mounted spring or flap, which applies downward tension on the crawfish to maintain the proper orientation before aligning with the opening of the tail meat extraction tray or trough.

In another preferred embodiment, the crawfish tray or troughs mounted on the conveyor belt is advanced to a position aligning the tray with the leading opening aligned with the opening of the tray on the rotating table. The alignment of the conveyor to the rotating table is monitored by an electronic monitoring method. When the two trays are in proper aligned position a mechanized device delivers the crawfish into the tail meat extraction apparatus tray. The preferred method of inserting the crawfish body into the tail meat extraction apparatus is by using an fluid (air or liquid) or electric powered mechanical rod or piston capable of moving the crawfish from the conveyor tray into the tray of the tail meat extraction apparatus.

In another preferred embodiment, the crawfish upright orientation is assisted during the transfer by internal grooves and projections located inside the tray on the conveyor and in the tray on the rotating table. A purpose of the internal groves and projections is to aid the proper alignment and positioning.

In another preferred embodiment, the tail meat extracting apparatus is constructed of non-corrosive, durable materials including but not limited to high-density plastic or non-corrosive metal.

In another embodiment, the tail, meat extracting apparatus is mounted within a metal framework capable of supporting one or more tail meat extracting apparatus along with supporting the crawfish supply tray and/or mechanized conveyor and transfer piston.

In an embodiment, the crawfish tray affixed to the rotating table is constructed from a non-corrosive material containing a physical opening or bottom slot center aligned with in the base or bottom of the tray in the same in-line as the crawfish body. The opening or bottom slot is sufficiently sized to allow for the process apparatus used to allow upward through the bottom slot. The process apparatus may include, but not limited to, a tail straightening brush, a exoskeleton cutting blade, a tail meat extraction vacuum device, and a crawfish carcass air plus device.

In another embodiment, the rotating table may be replaced with a rotating conveyor where crawfish holding trays are affixed allowing for proper placement and orientation of the crawfish body. The rotating conveyor is directed by an onboard computer controller and electronic monitoring devices to travel to the process positions allowing for the various steps described herein extracting the crawfish tail meat and other edible portions. When the tail meat extraction step is complete the rotating conveyor returns to the start position by rotating in an inverted manner discharging the crawfish carcass to a container below the conveyor.

In another embodiment, the rotating table described herein can be substituted with a single crawfish tail meat extraction channel comprising of a guiding channel wherein a single crawfish enters at a time and mechanically moved along the channel and is ejected at the end following the vacuum extraction of the tail meat. The ejection of the crawfish carcass may be assisted by hydraulic force (air or water) or by mechanical means. The channel may be constructed and assembled with a plurality of tail meat extraction channels adjacent to each other allowing greater output of crawfish tail meat extraction. The tail opening step, the tail cutting step, and the tail vacuum extraction step are similar to the process described within.

In another embodiment, the pneumatic airbag device used to apply pressure downward on the crawfish on the rotating table device may be substituted for a rotating wheel engaged by a mechanical means.

Other objects, features, and advantages of the present invention will become apparent from the following detailed description taken in conjunction with the accompanying drawings. The detailed description and the specific examples, while indicating embodiments of the invention, are given by way of illustrating only, since various changes and modifications within the spirit and scope of the invention will be apparent to those skilled in the art from this detailed description.

DRAWINGS

For a further understanding of the nature, objects, and advantages of the present invention, reference should be had to the following detailed description, read in conjunction with the following drawings, wherein like reference numerals denote like elements and wherein.

Descriptions below are made with reference to the above-listed Figures.

DETAILED DESCRIPTION

Before explaining the present apparatus and methods in detail, it is to be understood that the equipment and methods are not limited to the particular exemplary embodiments and that it can be practiced or carried out in various ways. The disclosure and description herein are illustrative and explanatory of one or more presently preferred embodiments and variations thereof. It will be appreciated by those skilled in the art that various changes in the design, organization, order of operation, means of operation, equipment structures and location, methodology, and use of mechanical equivalents may be made without departing from the spirit of the invention. It is contemplated that any method or composition described herein can be implemented with respect to any other method or composition described herein.

As well, it should be understood that the drawings are intended to illustrate and disclose presently preferred embodiments to one skill in the art, but are not intended to be manufacturing level drawings, and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to the explanation in conjunction with the drawings and that the components may be oriented differently, for instance, during transportation and manufacturing as well as operation. Because many varying and different embodiments may be made within the scope of the concepts herein taught. Additionally, modifications may be made in the embodiments described herein; it is to be understood that the details herein are to be interpreted as illustrative and non-limiting.

Figure 1:
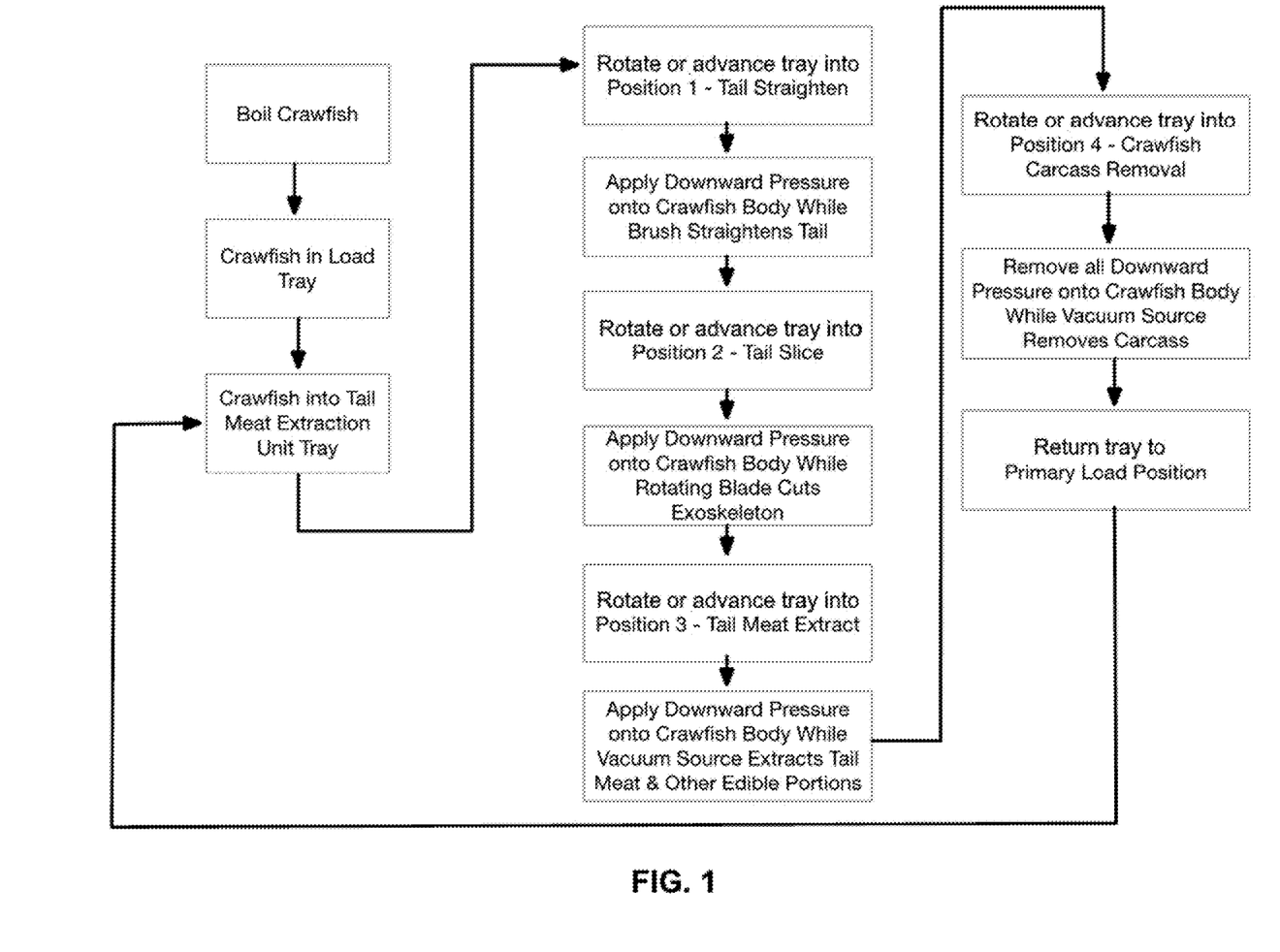
FIG. 1 depicts a flowchart of the individual steps of the present invention.

Referring to FIG. 1, a box diagram of the general steps in the process of extracting tail meat from crawfish or crustaceans is shown. The crawfish are cooked by any suitable means (boiling or steaming being the most common) and placed into a loading tray with side walls forming a slot, having a tool opening or bottom slot at the bottom and a pressurized flap at the top. Once loaded, the pressurized flap closed and the loading tray rotates the cooked crawfish between four active process positions. Position one involves straightening the crawfish with a brush extending upwards into the bottom slot underneath the table, aligned with one loading tray.

With the flap applying steady pressure to maintain the crawfish in a straightened position, the table is then rotated such that the tray is above a second process position, in which a blade extends upward through the bottom slot and creates an incision along the crawfish's lower belly. The flap then applies a further level of pressure as the loading tray is rotated into the third process position, causing the incision to bulge outward (against suitable contours on either side of the bottom slot opening) and opening the tail meat to a vacuum conduit, which sucks the tail meat out of the boiled crawfish. The flap is then released as the loading tray advances to the fourth and final process position, where the remaining crawfish carcass can be ejected for disposal or further processing. The loading tray is subsequently returned to the first position.

Figure 2:
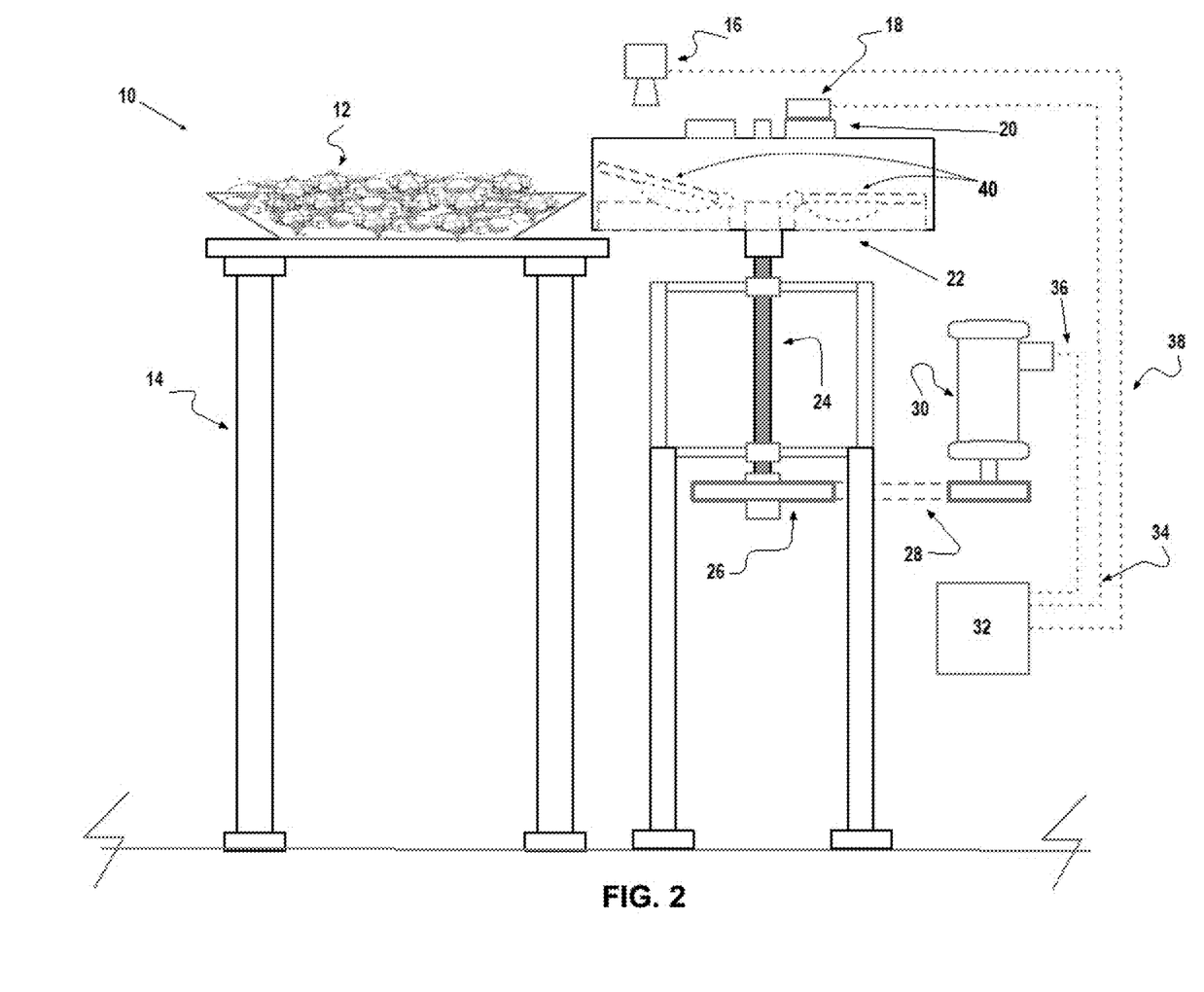
FIG. 2 is a partial side cross-section view of a crawfish supply table and assembled tail meat extraction unit.

Referring to FIG. 2, the side view elevation of the tail meat extraction unit, denoted generally as 10, is shown in conjunction with a cooked crawfish holding container 12 located immediately adjacent to the tail meat extraction apparatus placed on top of the worktable 14. The rotating table 22 is mounted in a frame, and within the frame is mounted a center rotating shaft 24 to support and rotate rotating table 22. The rotating shall can be rotated using a pulley 26 connected by a belt or chain to a second pulley 28 connected to a motor drive unit 30. The motor drive unit 30 is connected by electric wire 36 to an onboard computer controller 32.

The rotating table 22 comprises a plurality of crawfish trays 40. The cover of the rotating table 22 is fitted with location sensing devices 20 that send a location signal to a signal receiver 18 connected by electric wire 34 to the onboard computer controller 32. A machine vision camera 46 is located above the first crawfish tray 40 affixed to the rotating table 22, and the cover of rotating table 22 comprises an opening or top slot to enable the camera 16 to see the crawfish tray 40 in that position. The camera is connected via electric wire 33 to the onboard computer controller 32.

Figure 3:
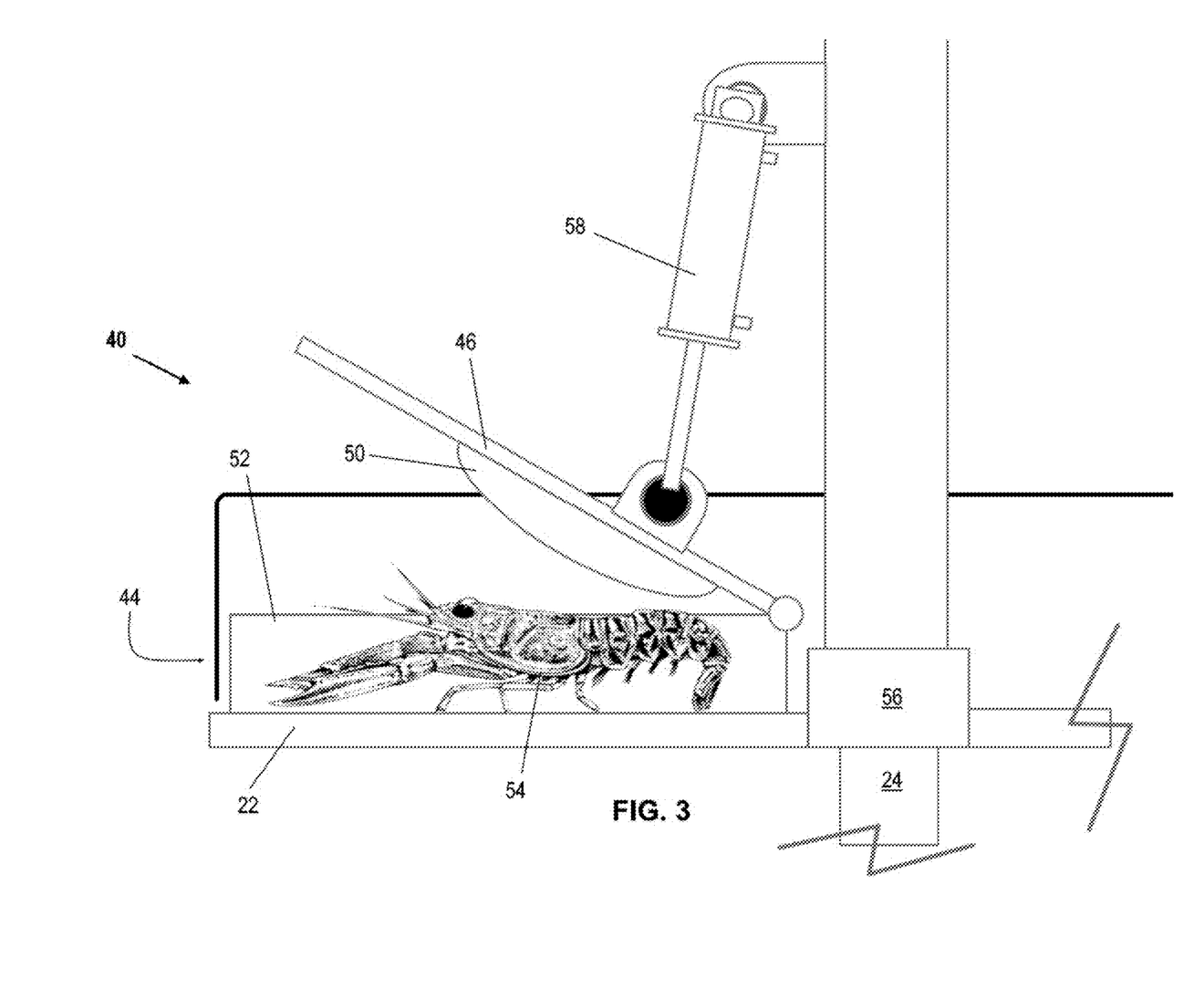
FIG. 3 is a partial side cross-section view of a crawfish tray for use with the tail meat extraction unit.

It can be appreciated that the embodiment shown in FIG. 2 is only exemplary in many respects. For instance, in some embodiments, any or all of the electric wires 34, 36, 38 may be absent, and the computer controller 32 may monitor and control the various sensors, cameras, and motors via wireless radio signal (e.g., Bluetooth or other suitable protocol). Alternatively, some embodiments may dispense with the pulleys 26, 28 and control the rotating shaft 24 via a direct motor connection, or dispense with the shaft 24 and control the rotating table directly. Any or all of these modifications may be possible without departing from the scope of this disclosure Referring to FIG. 3, the partial side view of a crawfish tray 40 is shown in greater detail. A slot 52 located on the rotating table 22 receives an individual cooked crawfish 54 which is placed in an upright position with the tail facing towards the center of the rotating table 22. The opening 44 of the slot 52 faces outward to allow for possible loading via an aligned conveyor tray (not shown here). The pressure flap 46 is mounted above the crawfish body and pivoted with a hinge 48 which may be energized to hold the crawfish body in place. A pressurized air hag 50 is affixed to the bottom of the pressure flap 46 in a way when air pressure is forced into the airbag by an external air pressure source (not shown), the bag inflates, creating additional downward pressure on the crawfish 54 without crushing the body. Motive force for the flap 46, as well as air for inflation of the bag 50, is provided by a pneumatic actuator 58 (shown here, present but omitted in FIGS. 4-6 for clarity) which pressurizes both flap 46 and bag 50. The rotating table 22 is supported by a rotating shall 24 as shown in FIG. 2 and securely fastened with a locking device 56.

Figure 4:
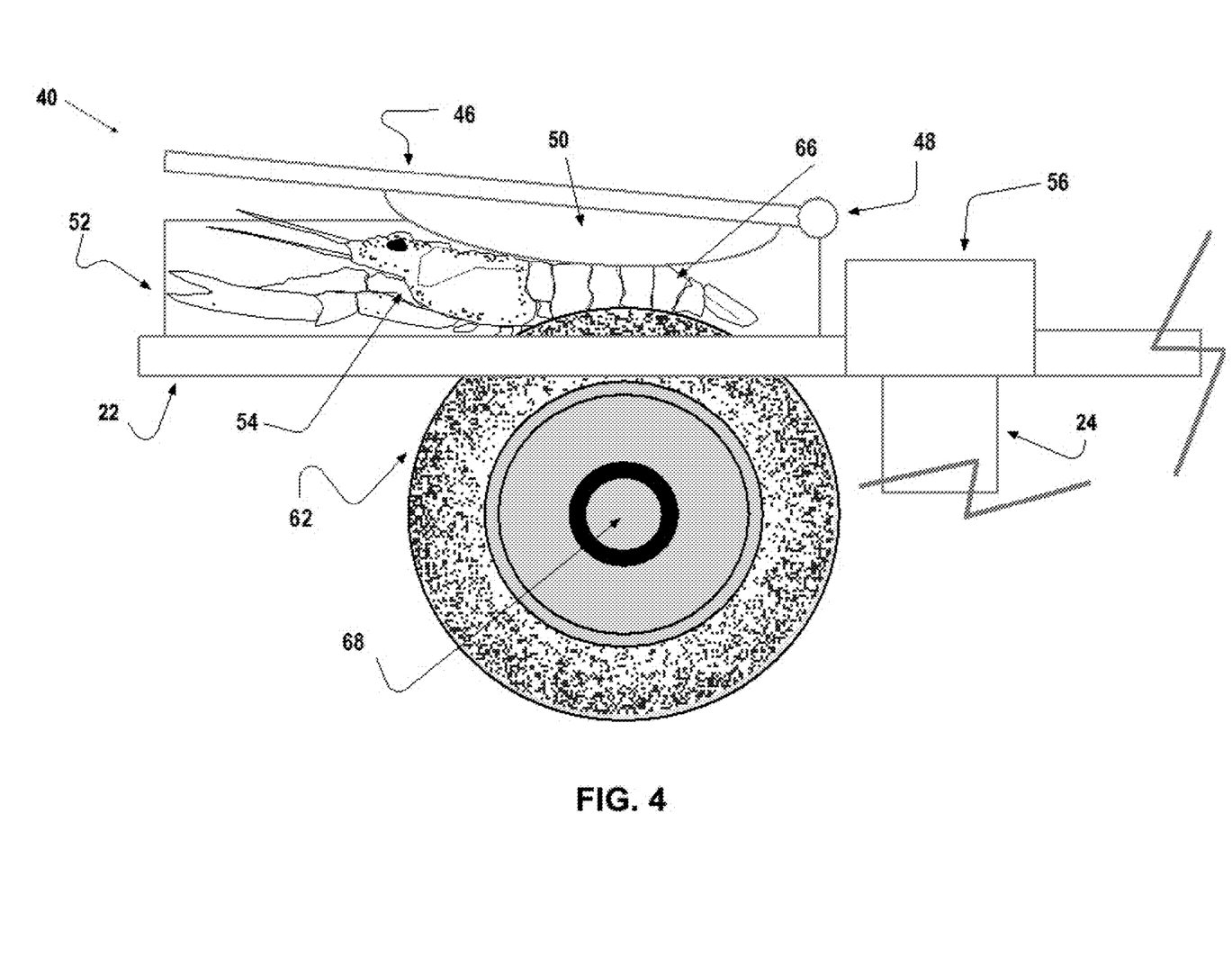
FIG. 4 is a partial side cross-section view of the crawfish tray in a first process position.

Referring to FIG. 4, the same view of crawfish tray 40 on the rotating table 22 is shown in the first process position, with the crawfish body 54 now being pressed downward by the pressure flap 46 and air pressure bag 50 in such a manner to engage downward with force onto the crawfish tail section 66. As shown in the figure, brush 62, rotating on shaft 68, travels up through a bottom slot (not shown) in the base of the tray 40 and rotating table 22 in a manner to contact and engage with the tail section 66 of the cooked crawfish 54. The brush is rotated with sufficient rotating speed and force to uncurl the tail section 66 into a straight position. As in FIG. 3, the rotating table 22 is supported and rotated by a shaft 24 fixed into individual process positions by a lock 56. Once the tail is straightened, the brush 62 is lowered, and the rotating table 22 rotates the crawfish tray 40 into the second process position.

Figure 5:
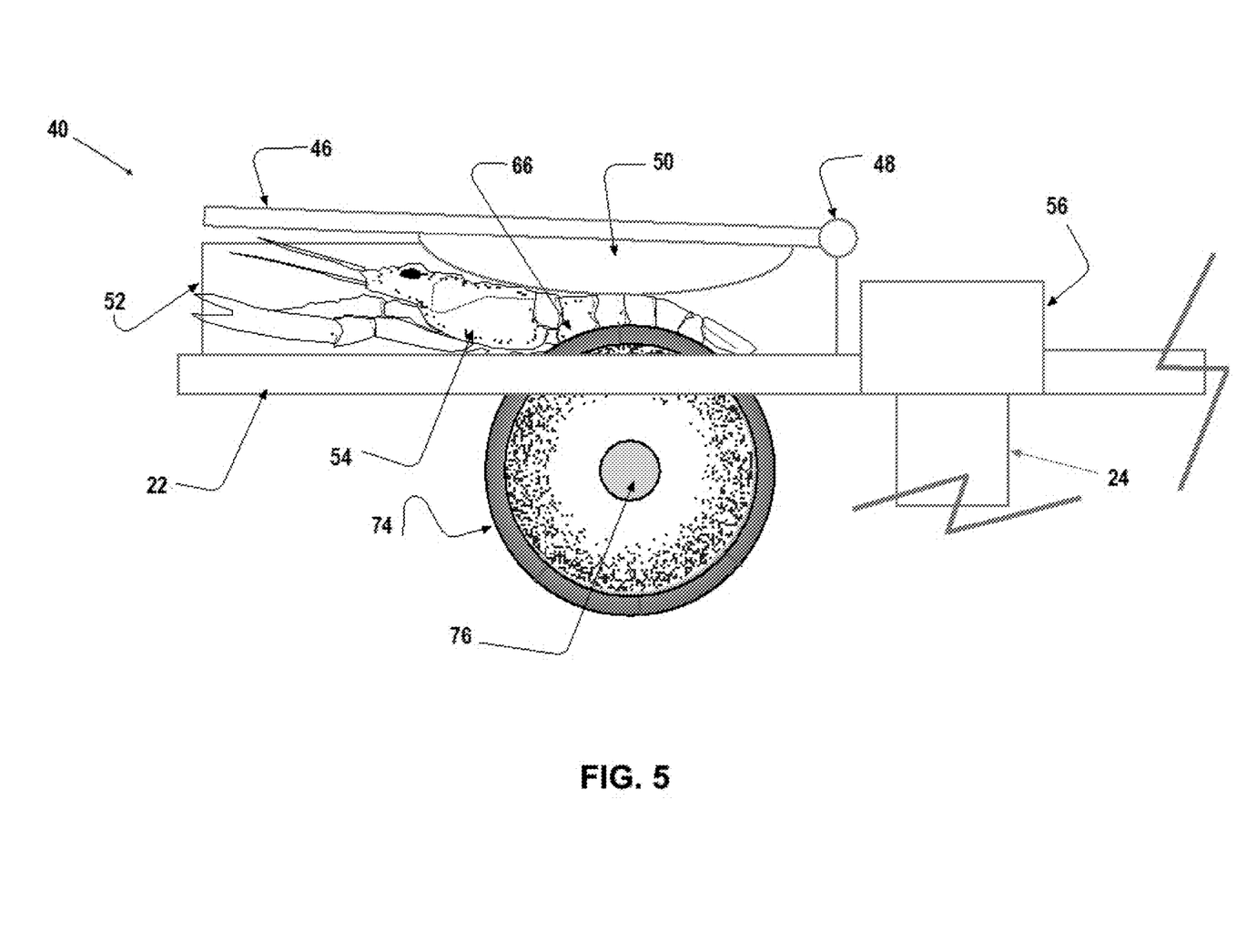
FIG. 5 is a partial side cross-section view of the crawfish tray in a second process position.

Referring to FIG. 5, the same view of crawfish tray 40 on rotating table 22 is shown in the second process position. As depicted, a motor driven cutting blade 74 is positioned in an opening in the bottom of the slot 52 to a distance sufficient to cut the bottom exoskeleton of the crawfish 54. The cutting blade 74 is rotating at a sufficient speed to create a cut with clean margins through the crawfish exoskeleton at the tail portion 66 exposing the tail meat over the opening or bottom slot in the tray 40. Pressure flap 46 hold the crawfish in position and the air pressure bag 50 applies a downward three to the crawfish tail keeping it in a straight flat orientation as the cutting blade 74 creates its incision, after which the blade 74 is lowered, and the rotating table 22, supported by shaft 24 and lock 56, rotates the crawfish tray 40 into the third process position.

Figure 6:
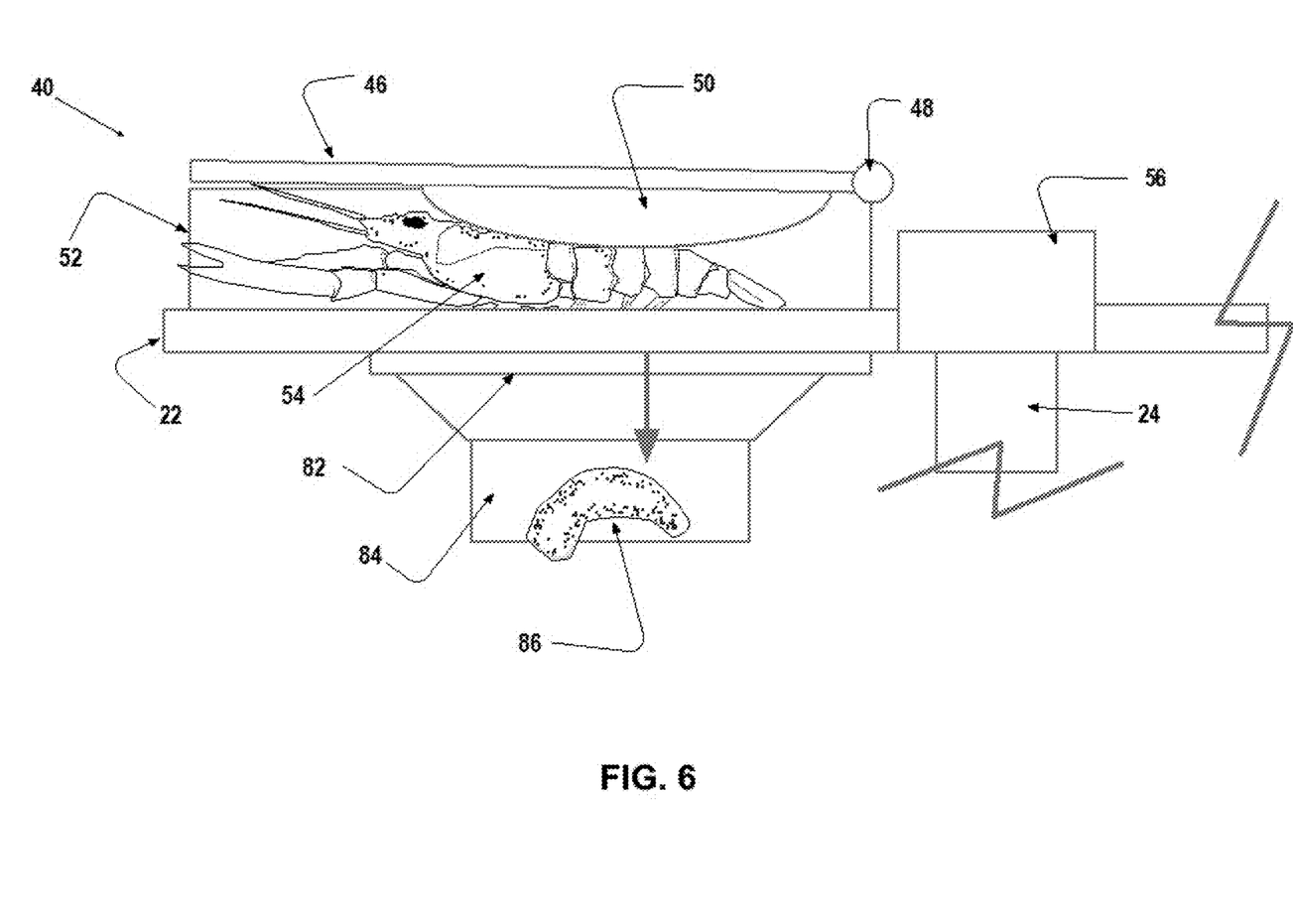
FIG. 6 is a partial side cross-section view of the crawfish tray in a third process position.

Referring to FIG. 6, the same view of crawfish tray 40 on rotating table 22 is shown in the third process position. The now sliced crawfish 54 is positioned in its slot 52 above a vacuum channel 84. The pressure flap 46 and air pressure bag 50 now apply greater pressure, forcing the cut in the bottom of the crawfish tail to open wide and expose the crawfish tail. Internal projections, not shown here, in the base of the tray along each side of the bottom slot help to open the tail shell, allowing the vacuum force exerted by vacuum channel 84 to extract the crawfish tail meat. The vacuum channel 84 connects with a seal 82 along the bottom of the rotating table; in an embodiment, this seal may be an elastomeric seal or any other material suitable to provide an air-tight connection and improve suction force by vacuum on the crawfish tail meat 86. The crawfish tail meat 86 is extracted and travels down the vacuum channel 84. After this, the seal is relaxed and the rotating table 22, supported by shaft 24 and lock 56, rotates the crawfish tray 40 into the fourth process position.

Figure 7:
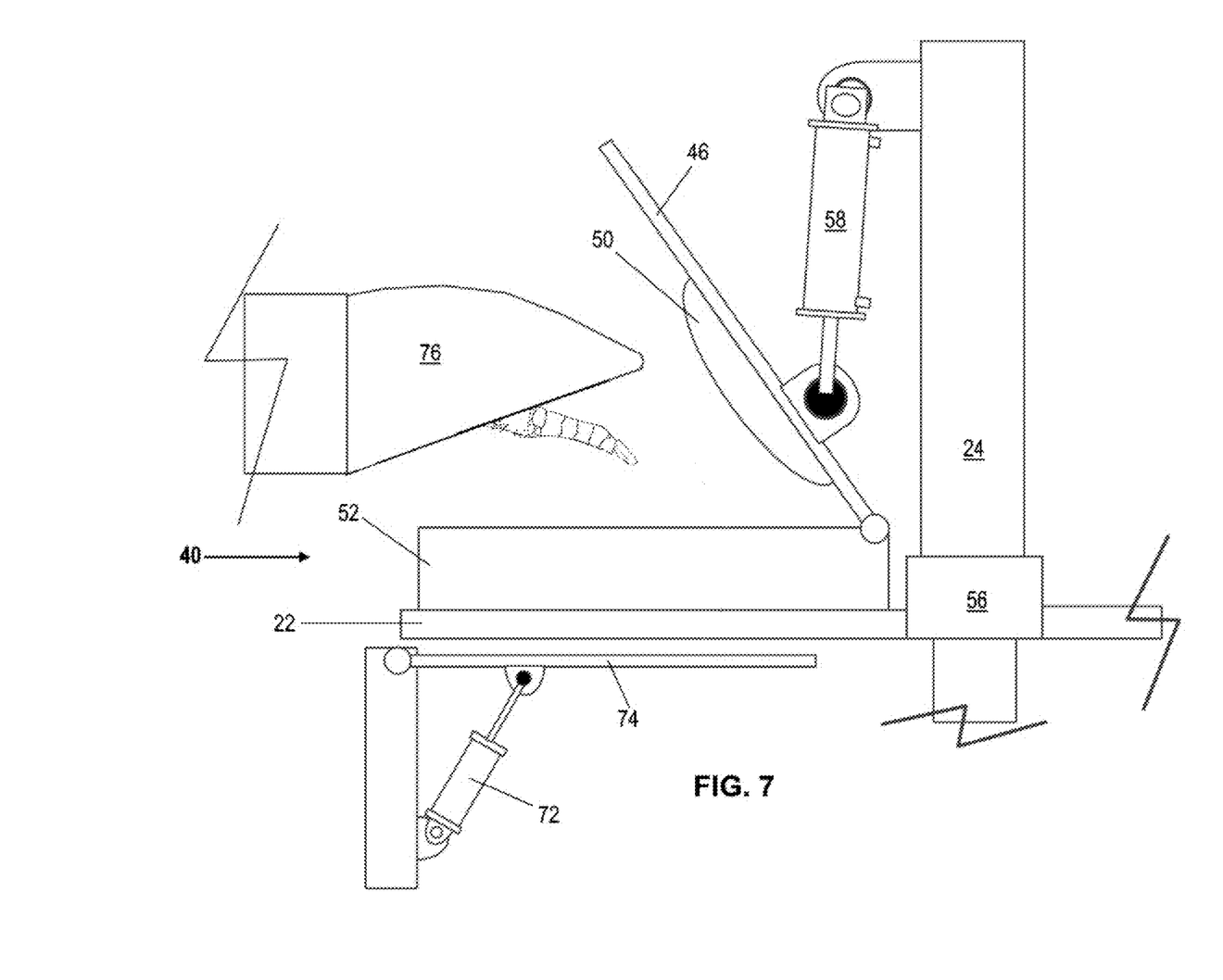
FIG. 7 is a partial side cross-section view of the crawfish tray in a fourth process position.

Referring to FIG. 7, the same view of crawfish tray 40 on rotating table 22 is shown in the fourth process position. Here, the pressure flap 46 and pressure bag 50 are fully de-pressurized and the flap 46 is lifted off the carcass by pneumatic cylinder 58. The fourth process position is characterized by the use of a blunt ejector bar 74 (shown in this embodiment powered by secondary pneumatic cylinder 72) which pushes the carcass off of the tray 40 and into a vacuum 76 which conveys the carcass either for disposal or further processing. It can be appreciated that other embodiments may be possible, e.g., the physical ejector bar 74 may be replaced by a water jet.

Figure 8:
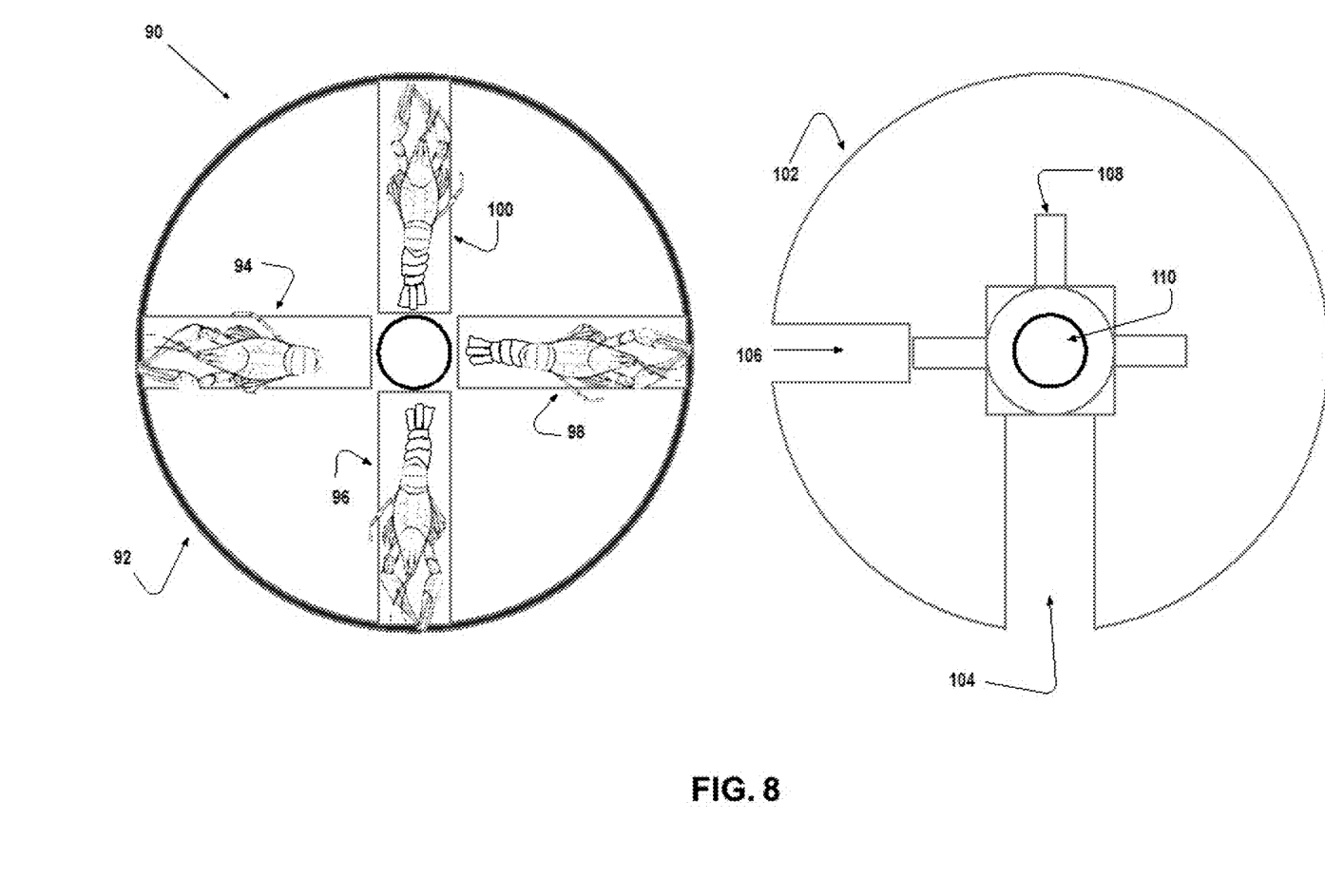
FIG. 8 is an overhead view of a rotating table with and without its cover for use with the tail meat extraction unit.

Referring to FIG. 8, a top-down view of the rotating table 22 and its corresponding cover 23 are shown with four crawfish positioned in trays 40A, 40B, 40C, and 40D. The rotating tray 22 is fitted with a cover 23 with two cutouts 104, 106, corresponding to the first and fourth process position, respectively, to allow for manual, placement of the crawfish in a tray at the first process position, and to allow for ejection of the crawfish carcass at the fourth process position, following the extraction of tail meat. The cover and rotating table are supported upon a shaft 24 and positions of placement can be monitored by electronic one or more in-line electronic sensors 108.

Figure 9:
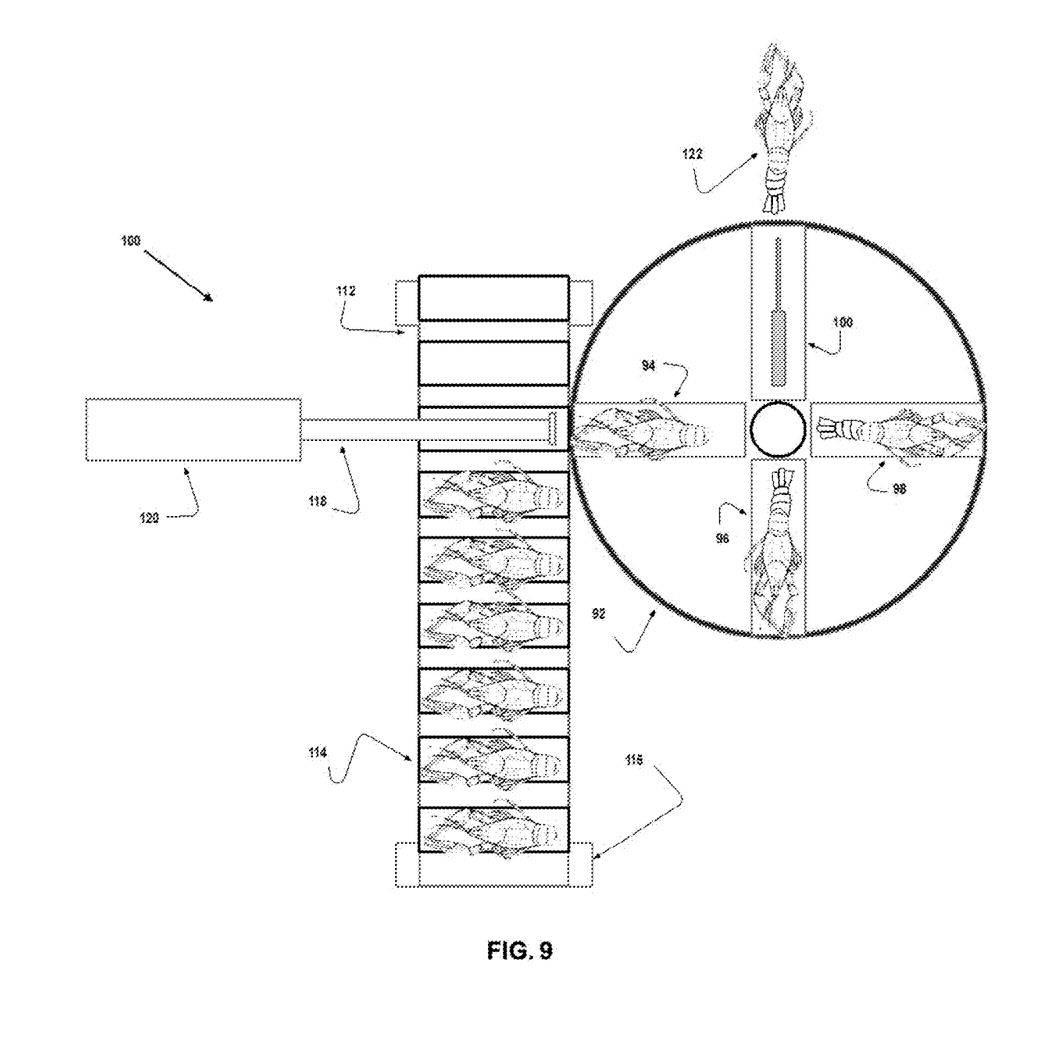
FIG. 9 is an overhead view of a rotating table showing a possible use with an automated loading apparatus for placing cooked crawfish into the loading trays of FIGS. 3-7.

Referring to FIG. 9, a top-down view of the rotating table 22 is shown with four crawfish positioned in individual trays 40A, 40B, 40C, and 40D. The rotating tray 40A is in the first process position, where it may receive a crawfish from an aligned tray on the rotating conveyor 114 being driven by shafts 112, 116. When a tray containing a crawfish is aligned with the first process position of the rotating table 22, a pusher piston 118 piston may extend from a motor 120 to place crawfish into the corresponding tray 40A. When the overhead camera (as depicted in FIG. 2) detects that the tray 40A is occupied, it can direct the pressurized) lid to shut (as depicted in FIG. 4) and begin the first stage of the process. Meanwhile, the trays 40B and 40C are shown in the second and third process position, respectively, with the rotating blade and vacuum extractor located underneath the rotating table 22 and functioning as depicted in FIG. 4 and FIG. 5, respectively.

It can be appreciated that while the rotating table 22 is shown having four slots which are rotated over a brush, a blade, a vacuum channel, and an ejector, in sequence, other embodiments may be possible without departing from the scope of the disclosure. For example, it may be possible to have a rotating table with eight slots, with two conveyors, two brushes, two ejectors, etc., and thereby double the throughput of the system.

Figure 10:
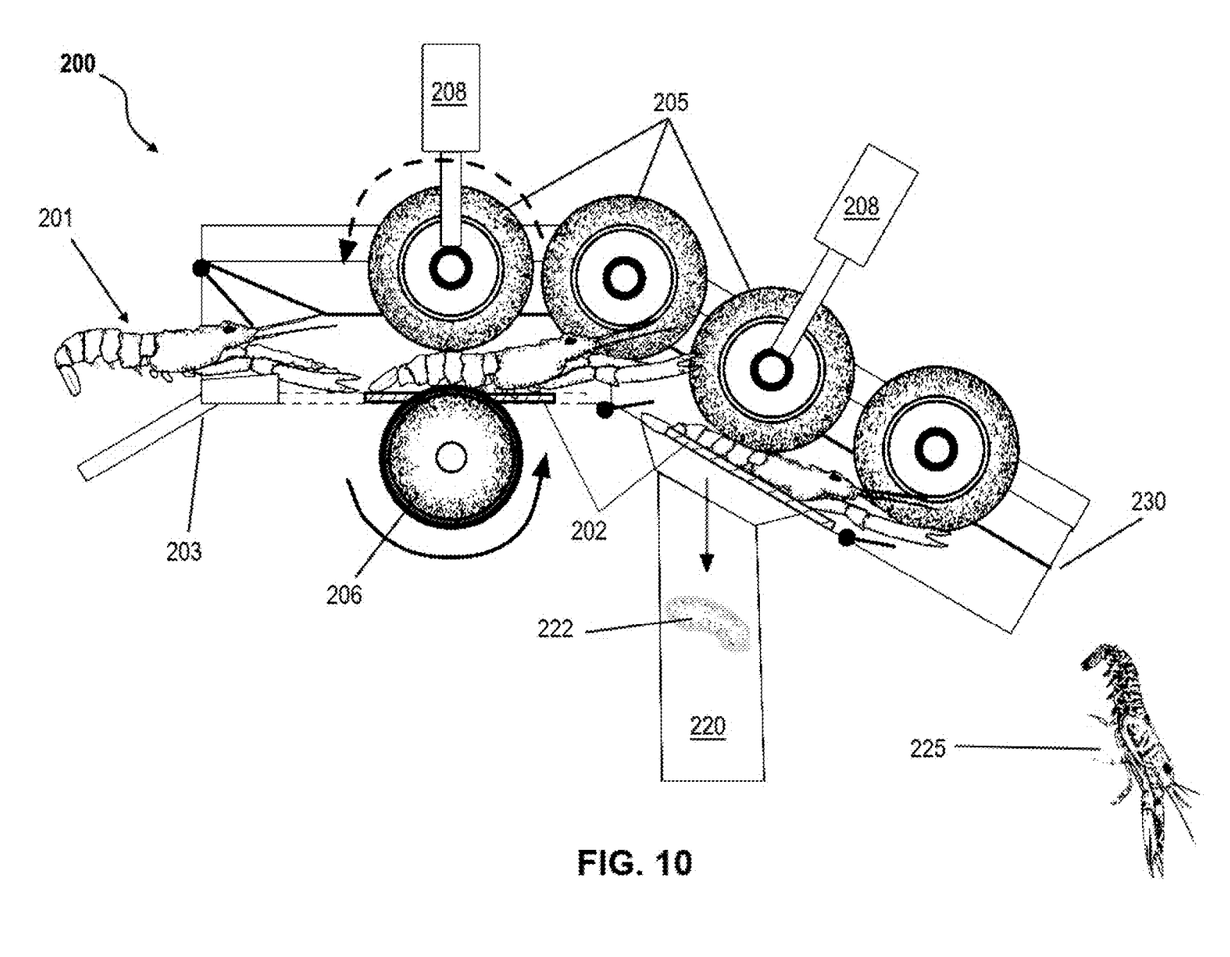
FIG. 10 is an overhead view of an alternate embodiment of the invention utilizing a straight assembly line configuration

Turning, now to FIG. 10, an alternate embodiment of the system 200 is shown in which the rotating table is replaced by an assembly line configuration in which the cooked crawfish 201 are placed onto trays 202 and fed through an entrance 203 into a sequential series of stations similar to those described in the circular embodiment of FIGS. 2-9. In this embodiment, the downward pressure may be applied to the crawfish directly by overhead wheels 205. (it can be appreciated that these wheels may be replaced by mechanically obvious variants, e.g., a conveyor belt, without departing from the scope of the disclosure.) As with the previous embodiments, the crawfish is first flattened by simultaneously applying a rotational three to the bottom of the crawfish by means of a brush 206 extending upwards through the slot 209 (shown in the cross-sections of FIGS. 11-12) of the trays 202. Wheels 205 are powered by motors 208.

Figure 11:
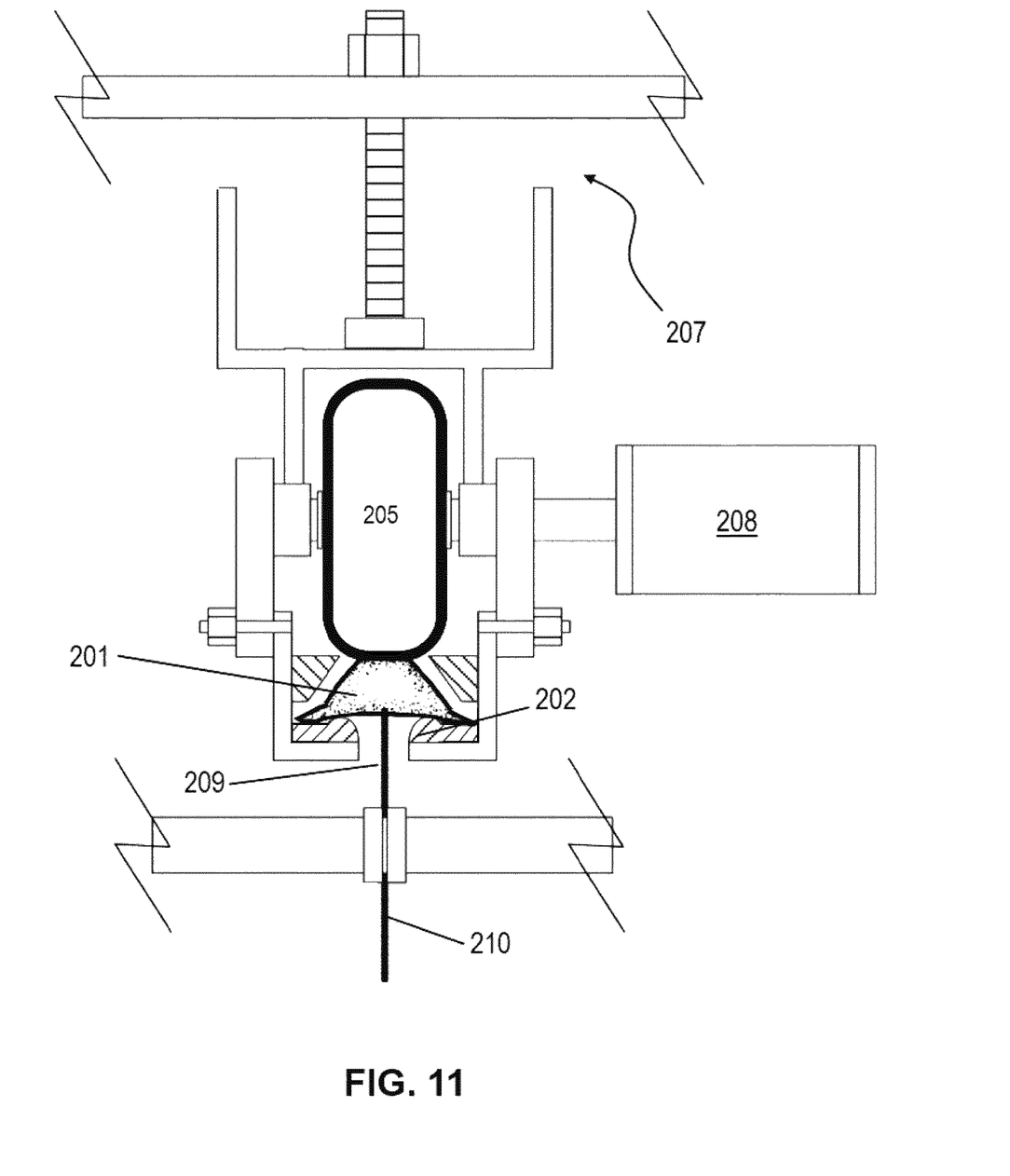
FIG. 11 is a cross-section view of the blade portion of the assembly line configuration depicted in FIG. 10.
Figure 12:
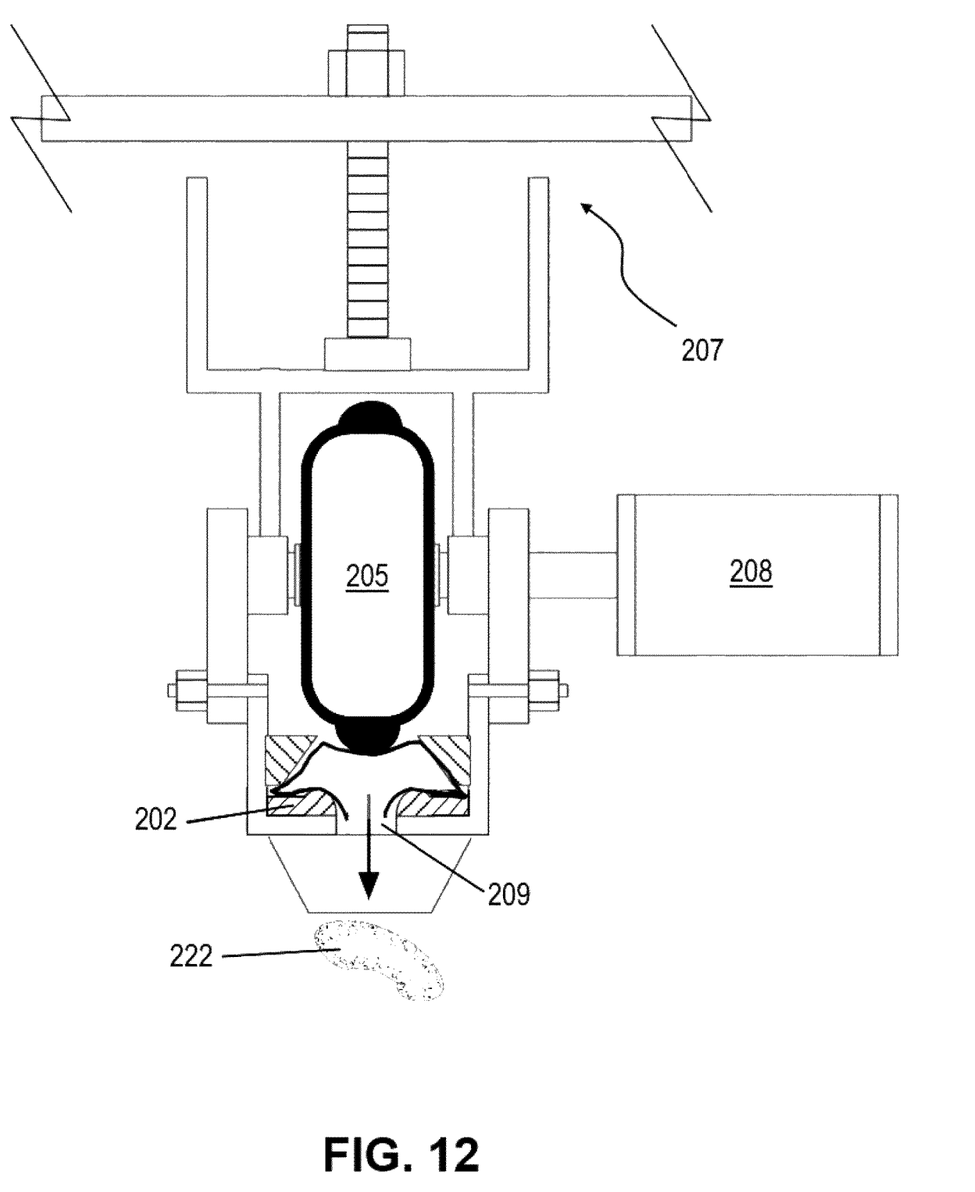
FIG. 12 is a cross-section view of the vacuum conduit portion of the assembly line configuration depicted in FIG. 10.

Omitted in FIG. 10 for brevity, but depicted in FIG. 11 in cross section, the cooked crawfish 201 is then sliced open from the bottom by means of a rotating blade 210 which extends upwards through slot 209 in tray 202. In this embodiment, the slot 209 may run through the length of tray 202 enabling the tray to pass over the brush 206, the blade 210, and the vacuum conduit 220 without requiring any of these elements to be extended or withdrawn upwards. FIGS. 11-12 also depict the an overhead press assembly 207 which may be utilized for applying gentle downward pressure while still advancing the crawfish along the assembly line.

Turning now to FIG. 12, the cooked crawfish 201 is then placed above a vacuum conduit 220 which applies a negative pressure to the bottom of tray 202 simultaneous to an increase in overhead pressure, which can either be applied by wheels 205 being of a larger diameter during this stage of the assembly line, by pressure applied through overhead bar assembly 207, or both, spreading the incision created in the bottom of the cooked crawfish 201 and enabling the tail meat 222 to be extracted from the carcass 225 (depicted in FIG. 10). Subsequent to the tail meat extraction step, the carcass 225 can then be discarded as shown in FIG. 10 simply by wheeling it out of an open end 230 of the assembly line 200.

Similar to the circular embodiment 100 depicted in FIGS. 2-9, the assembly line embodiment 200 depicted in FIGS. 10-12 may be run in multiple parallel configurations, e.g., four assembly lines 200 running in sequence, thereby vastly increasing the throughput of the system.

It will be understood that each of the elements described above, or two or more together may also find useful application in other types of methods differing from the type described above. While certain novel features of this invention have been shown and described and are pointed out in the annexed claims, it is not intended to be limited to the details above, since it will be understood that various omissions, modifications, substitutions and changes in the forms and details of the device illustrated and, in its operation, can be made by those skilled in the art without departing in any way from the spirit of the present invention.

The invention claimed is:

1. A method for extracting crawfish tail meat and other edible product from a cooker crawfish comprising:
    positioning a cooked crawfish on at least one tray comprising a slot at the bottom;
    applying downward pressure to the top of the cooked crawfish;
    extending a brush upwards through the bottom slot, of the at least one tray, wherein the brush rotates simultaneously to the downward pressure to urge the cooked crawfish into a straight position;
    extending a blade upwards through the bottom slot of the at leas one tray to create as incision in the bottom of the cooked crawfish;
    extending a vacuum conduit upwards to the bottom slot of the at least one tray, the vacuum conduit applying negative pressure to extract the crawfish tail meat through the bottom incision of the cooked crawfish; and
    releasing the downward pressure and ejecting the remaining carcass from the at least one tray.

2. The method of claim 1, wherein the downward pressure applied to the top of the cooked crawfish is increased during the step of extending the vacuum conduit upwards to apply negative pressure.

3. The method of claim 1, wherein the step of extending a vacuum conduit upwards to the bottom slot of the at least one tray comprises contacting the vacuum conduit to an elastomeric seal surrounding the bottom slot of the at least one tray.

4. The method of claim 1, wherein the step of positioning the cooked crawfish on the at least one tray is accomplished by a pusher piston.

5. The method of claim 1, wherein the at least one tray comprises at least four trays, each arranged on a rotatable table, such that the brush and the blade can extend upwards through the slots of the at least four trays to contact the cooked crawfish, and such crawfish tail meat can be vacuumed downward through the slots of the at least four trays.

6. The method of claim 5, wherein the steps of extending the brush upwards extending the blade upwards extending the vacuum conduit upwards, and ejecting the carcass each take place at sequential positions on the circular table as the trays are rotated and the slots are aligned.

7. The method of claim 6, wherein each tray of the at least four trays comprises a tension flap at the top of the tray, the tension flap applying downward pressure to the cooked crawfish.

8. The method of claim 5, wherein the step of ejecting the carcass from the at least one tray comprises actuating an ejector bar through the slot of the respective tray.

9. The method of claim 5, wherein the step of ejecting the carcass from the at least one tray comprises applying a pressurized water jet to the carcass.

10. The method of claim 5, wherein the circular table comprises a cover, wherein the cover is partially open over two of the at least four slots to enable loading al cooked crawfish prior to the application of downward pressure, and ejection of the carcass following the extraction of the tail meat.

11. The method of claim 1, wherein the at least one tray is conveyed sequentially through a track which extends over the brush, the blade, and the vacuum conduit, and wherein the steps of tending the brush upwards, extending the blade upwards, extending the vacuum conduit upwards, and ejecting the carcass take place in sequence as the tray is conveyed along the track.

12. The method of claim 11, wherein the steps of conveying the at least one tray and applying downward pressure to the top of the cooked crawfish are accomplished by means of a plurality of wheels located over the cooked crawfish on the at least one tray.

13. The method of claim 12, wherein the plurality of wheels increase in diameter proximate to the vacuum conduit.

14. The method of claim 11, wherein the step of extending the brush upward comprises rotating the brush in a direction opposite the plurality of wheels.

* * * * *